April 19, 1960 E. G. CLARK 2,933,622
SHIFT REGISTER
Filed Dec. 20, 1956
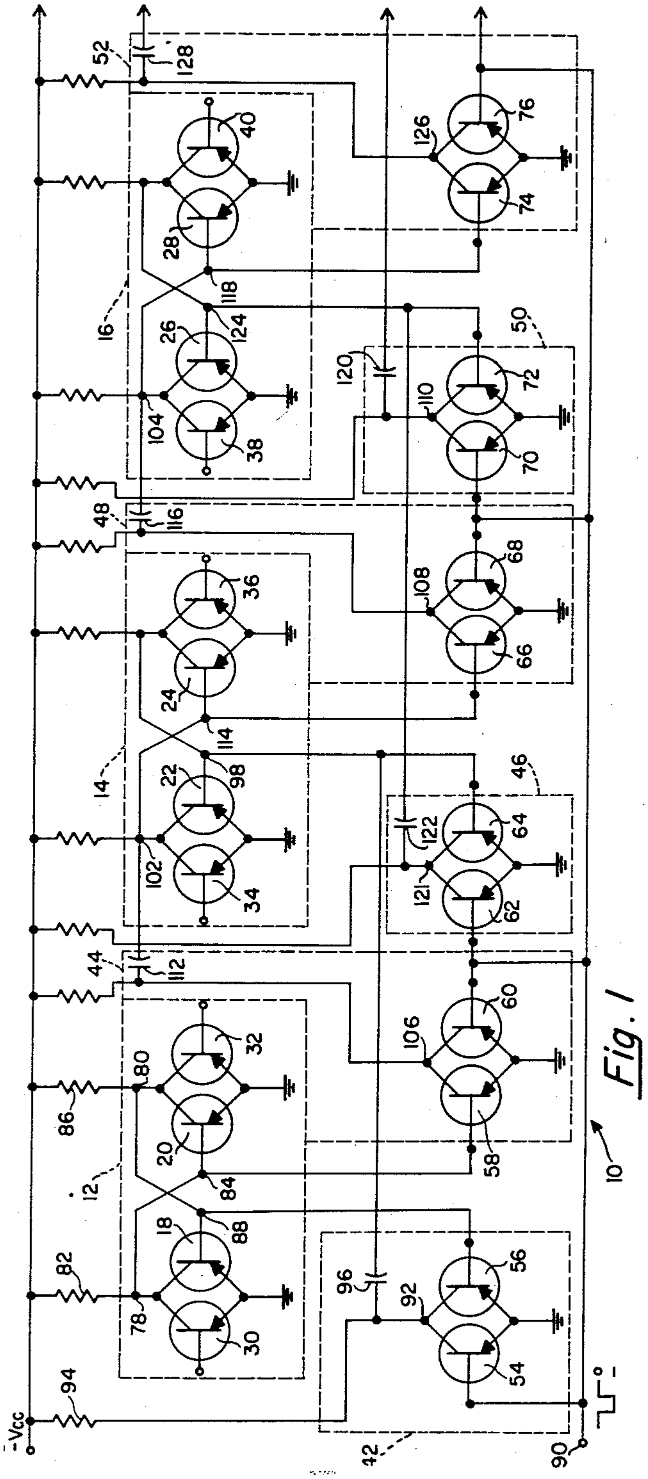
Fig. 1
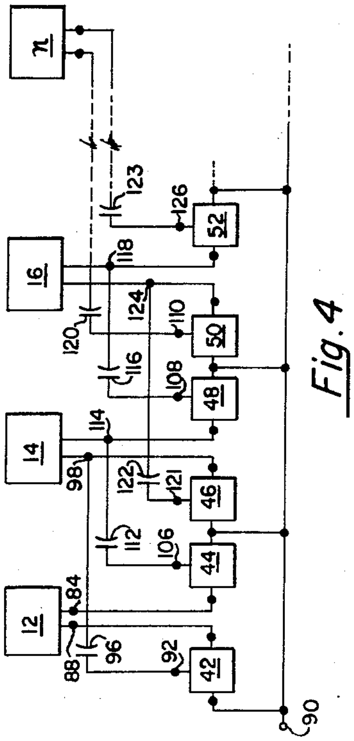
Fig. 4
| | 12 | 14 | 16 |
|---|---|---|---|
| 1 | 0 | 0 | 0 |
| 2 | 0 | 0 | 1 |
| 3 | 1 | 1 | 0 |
| 4 | 1 | 1 | 1 |
Fig. 3
| | 12 | 14 | 16 |
|---|---|---|---|
| 1 | 0 | 0 | 1 |
| 2 | 0 | 1 | 0 |
| 3 | 1 | 0 | 1 |
| 4 | 1 | 1 | 0 |
Fig. 2
INVENTOR.
EDWARD GARY CLARK
BY
Edward W. Hughes
ATTORNEY United States Patent Office 2,933,622
Patented Apr. 19, 1960

2,933,622

SHIFT REGISTER

Edward Gary Clark, Oreland, Pa., assignor to Burroughs Corporation, Detroit, Mich., a corporation of Michigan Application December 20, 1956, Serial No. 629,667

16 Claims. (Cl. 307—88.5)

This invention relates to means for causing one bistable device to assume a stable state corresponding to a stable state of another bistable device, and more particularly to shift registers.

A bistable device is a device having two stable states and two input terminals (or types of input signals), each of which corresponds with one of the two states. A bistable device will remain in either state until caused to change to the other state by the application of the corresponding signal. It is customary to denote one of the states of a bistable device as 0 and the other as 1.

In data processing machines it is frequently desirable to store information in a bistable device and, in response to a control signal, to transfer this information to another bistable device. A shift register is an extension of this concept to a number of bistable devices for the purpose of storing and manipulating binary data. Upon the application of a control signal, such as a shift pulse, to such a register, the information stored in each bistable device may be shifted, or transferred, to another bistable device in the same register. Displacing the information stored in a register to the left one place is the equivalent of multiplying the stored information by the radix 2, and displacing the information stored in a register to the right one place is the equivalent of dividing the stored information by the radix 2.

It has heretofore been necessary to provide shift registers with some means for preventing the bistable device of a given stage from responding to the input signal applied to it by the preceding stage before said given stage applies a satisfactory input signal to the succeeding stage. These means have included delay circuits which are incorporated in the input circuits, or output circuits, of bistable devices of each stage of a register. When delay circuits are used, it is also necessary to limit the width of each shift pulse so that it is less than the delay provided; otherwise, the information stored in the register will be shifted more than one place to the right, for example, for each shift pulse applied to the register.

The shift register described and claimed herein uses conditional steering gates such as are described and claimed in my co-pending application entitled "Complementing Flip-Flops," Serial No. 629,570, filed December 20, 1956. Each such gate has two conditions, an enabled condition and a disabled condition. The condition of a gate, in the absence of a shift pulse, is determined by the potential of the input terminal of the bistable device to which the gate has a D.C. connection. A disabled gate will produce substantially no output signal when a shift pulse is applied to it. Only when a gate changes from its enabled condition to its disabled condition upon the application of a shift pulse, does the gate produce a signal which, if applied to an input terminal of a bistable device, will cause the device to assume the state corresponding to, or depending on, the terminal to which the signal is applied. Conditional steering gates also include means which maintain them in their disabled conditions while a shift pulse is applied, so that a change of state of the controlling flip-flop while a shift pulse is present has no effect on the condition of the controlled gates. Thus there is no need to incorporate delay circuits in a shift register having conditional steering gates.

There is also no need to limit the width of each shift pulse since the period during which a bistable device has no control over the steering gates normally controlled by it is determined by the width of each shift pulse. Shift registers having conditional steering gates, as taught herein, will operate with shift pulses, the widths of which may be of an indefinite duration; i.e., a change in D.C. level. Since there are no fixed time delays incorporated in a shift register having conditional steering gates and since there is no need to limit the width of each shift pulse, the maximum operating frequency of such a shift register is generally greater than that of a shift register having delay means incorporated therein. Also such a shift register is easier and more economical to construct because of the fewer and less costly components required.

It is, therefore, an object of this invention to provide improved means for causing one bistable device to assume a stable state corresponding to a stable state of another bistable device.

It is a further object of this invention to provide a shift register having improved performance characteristics and which is easier and more economical to manufacture.

It is another object of this invention to provide a shift register using conditional steering gates.

It is still another object of this invention to provide a shift register in which the change of the steering gates to their enabled condition is conditioned upon the removal of each shift pulse.

It is still a further object of this invention to provide a shift register, the maximum operating frequency of which is substantially independent of the steering gates.

It is still another object of this invention to provide a shift register in which the width of each shift pulse may be substantially of any duration of time.

It is still a further object of this invention to provide a shift register in which the width of each shift pulse in excess of that necessary to initiate the operation of the register is not a factor in the proper operation of the shift register.

Other objects and many of the attendant advantages of this invention will be readily appreciated as the same become better understood by reference to the following detailed description when considered in connection with the accompanying drawing, wherein:

Fig. 1 is a schematic diagram of a portion of a shift register;

Figs. 2 and 3 are charts illustrating the operation of the device of Fig. 1; and Fig. 4 is a block diagram of a shift register of $n$ stages.

Referring to Fig. 1, a portion of shift register 10 is illustrated. Included in this portion are bistable devices 12, 14, 16. Bistable device 12 consists of transistors 18, 20, which are cross coupled to form a saturation flip-flop; bistable device 14 consists of transistors 22, 24, which are cross coupled to form a second saturation flip-flop; and bistable device 16 consists of transistors 26, 28, which are cross coupled to form a third saturation flip-flop.

Each of bistable devices 12, 14, 16 is provided with means for setting each of the flip-flops to one of its two stable states and for resetting it to the other of its stable states. Bistable device 12 is provided with set transistor 30, which is connected in parallel with transistor 18, and with reset transistor 32, which is connected in parallel with transistor 20. Similarly bistable device 14 is provided with set transistor 34, which is connected in parallel with transistor 22, and with reset transistor 36, which is connected in parallel with transistor 24; and bistable device 16 is provided with set transistor 38, which is connected in parallel with transistor 26, and with reset transistor 40, which is connected in parallel with transistor 28.

Each of the bistable devices is associated with, or controls, a pair of conditional steering gates. Thus bistable device 12 controls conditional steering gates 42, 44; bistable device 14 controls conditional steering gates 46, 48; and bistable device 16 controls conditional steering gates 50, 52. Conditional steering gate 42 consists of transistors 54, 56, which are connected in parallel; gate 44 consists of transistors 58, 60, which are connected in parallel; gate 46 consists of transistors 62, 64, which are connected in parallel; gate 48 consists of transistors 66, 68, which are connected in parallel; gate 50 consists of transistors 70, 72, which are connected in parallel; and gate 52 consists of transistors 74, 76, which are connected in parallel.

It is possible to design circuits using pnp junction transistors of the alloy, grown, or surface barrier types in the common emitter configuration, so that the transistors of such circuits will saturate, or bottom, if the potentials of their bases with respect to their emitters, which are generally at ground potential, are more negative than −0.3 v. and so that the transistors will be substantially biased off if the potentials of their bases with respect to their emitters are approximately −0.1 v., or more positive. These voltages obviously may vary depending on the characteristics of the transistors used, as is well known in the art. In such circuits the potential of the collector of a bottomed transistor will be approximately −0.1 v., or more positive, or approximately at ground potential, which potential when applied to the base of a transistor in a similar configuration, is sufficient to cut off the transistor. The devices described and illustrated as examples of embodiments of the invention use transistor circuits having substantially such operating characteristics.

In order to simplify the explanation of the operation of the shift register, the operation of a single bistable device such as flip-flop 12 and the operation of a conditional steering gate such as gate 42 will be made in greater detail. The operation of flip-flops 14, 16 will be substantially the same as that of flip-flop 12, and the operation of steering gates 44, 46, 48, 50, 52 will be substantially the same as that of conditional steering gate 42. If it is assumed initially that transistor 18 is cut off, then the potential of terminal 78, which is connected to the collector of transistor 18, will be at some negative potential. This negative potential, which is applied to the base of transistor 20, causes transistor 20 to bottom so that the potential of terminal 80, which is connected to the collector of transistor 20, is substantially at ground potential. The potential of terminal 78 of transistor 18 is determined by the magnitude of the collector supply source Vcc, which is not illustrated, and the voltage drop across load resistor 82 due to the base currents drawn by transistor 20 and transistor 58.

When a positive pulse of sufficient amplitude is applied to input terminal 84 of flip-flop 12, the potential of the base of transistor 20 will be made more positive, raising it approximately to ground level, which cuts off transistor 20. This causes the potential of collector 80 of transistor 20 to be negative. This negative potential, which is applied to the base of transistor 18, causes transistor 18 to bottom. Collector 78 of transistor 18 becomes more positive, substantially reaching ground potential, which is sufficient to maintain transistor 20 cut off. The magnitude of the potential of terminal 80 is determinal by Vcc and the potential drop across load resistor 86 due to the base currents drawn by transistors 18 and 56.

The application of a positive going pulse of sufficient amplitude to input terminal 88 will raise the potential of the base of transistor 18 substantially to ground potential, which cuts off transistor 18. When transistor 18 cuts off, the negative potential of collector 78 is sufficient to cause transistor 20 to bottom, and flip-flop 12 has returned to its initial state with transistor 18 cut off and transistor 20 bottomed. It should be noted that input terminals 84, 88 of flip-flop 12 are directly connected to the collectors of transistors 18, 20.

With respect to gate 42 the base of transistor 56, which serves as one of the input terminals of gate 42, is connected to input terminal 88 of flip-flop 12, and the base of transistor 54, which serves as the other input terminal of gate 42, is connected to shift terminal 90 of shift register 10. With flip-flop 12 in its initially defined condition with transistor 18 cut off and transistor 20 bottomed, transistor 56 will also be cut off since its base is also substantially at ground potential. In the absence of a shift pulse, shift terminal 90 is substantially at ground level. Thus the base of transistor 54 will be at ground potential and transistor 54 will also be cut off. When transistors 54, 56 are both cut off, the potential of output terminal 92, which is connected to the collectors of transistors 54, 56, will be at a negative potential substantially equal to Vcc since it is connected through load resistor 94. When conditional steering gate 42 is in this condition, it is defined as being enabled.

When a negative going shift pulse of sufficient amplitude is applied to shift terminal 90, transistor 54 bottoms. This causes the potential of terminal 92 to increase suddenly. This increase in potential is coupled through capacitor 96 to input terminal 98 of flip-flop 14 as a proper, or positive going, pulse. If flip-flop 14 is in that state in which input terminal 98 is negative, then the positive going pulse produced by gate 42 will cause flip-flop 14 to change to the state in which input terminal 98 is substantially at ground potential. If flip-flop 14 is in the state in which terminal 98 is substantially at ground potential, a positive going pulse applied to terminal 98 will produce no change in state of flip-flop 14.

When the potential of input terminal 88 of flip-flop 12 is at a negative potential, the base of transistor 56 will be negative and transistor 56 will bottom. Therefore, terminal 92 will be substantially at ground potential, even though transistor 54 is cut off, because shift terminal 90 is substantially at ground potential in the absence of a shift pulse. The application of a negative going shift pulse to terminal 90 will produce substantially no change in the potential of terminal 92 since it was substantially at ground potential because of bottomed transistor 56. When terminal 92 is substantially at ground potential, the condition of conditional steering gate 42 is defined as being disabled.

As long as a shift pulse is applied to, or present at, shift terminal 90, transistor 54 of gate 42 will remain bottomed, the potential of output terminal 92 will be maintained substantially at ground potential, and gate 42 will be disabled, irrespective of the potential of the base of transistor 56. At the termination of each shift pulse, transistor 54 cuts off, releasing gate 42 to the control of flip-flop 12. The potential of terminal 92 and the condition of gate 42 will then be determined by whether or not transistor 56 is bottomed or cut off, which in turn depends upon the state of flip-flop 12. If input terminal 88 of flip-flop 12 is substantially at ground potential, then transistor 56 will also be cut off, and the potential of terminal 92 will decrease from substantially ground potential to a potential equal to Vcc, and gate 42 will become enabled. This change in potential of terminal 92 is coupled as a negative going pulse by capacitor 96 to input terminal 98 of flip-flop 14. If the potential of input terminal 98 is negative, the negative pulse will produce no change in state of flip-flop 14. If flip-flop 14 is in that state in which terminal 98 is substantially at ground potential, the negative pulse produced will be insufficient to cause flip-flop 14 to change state because the impedance between input terminal 98 and ground through bottomed transistor 24 is very much smaller than the impedance of capacitor 96.

When a negative pulse of sufficient amplitude is applied to the base of set transistor 30, flip-flop 12 will assume a stable state in which terminal 78 is substantially at ground potential. If a negative pulse of sufficient amplitude is applied to the base of reset transistor 32, flip-flop 12 will assume a stable state in which terminal 80 is substantially at ground potential. Circuit means for applying the necessary set and reset pulses to set transistor 30 and to reset transistor 32, respectively, of flip-flop 12, for example, are not illustrated. Flip-flop 14 may be set in the state in which the potential of terminal 102, which is connected to the collectors of transistors 22, 34, is substantially at ground potential, or it may be reset to the state in which the potential of terminal 102 is negative. Similarly by the application of set and reset pulses to transistors 38, 40, respectively, flip-flop 16 may be set in the stable state in which the potential of terminal 104, which is connected to the collectors of transistors 26, 38, is substantially at ground potential, or it may be reset to that state in which the potential of terminal 104 is negative. The state of flip-flop 12 in which the potential of terminal 78 is negative may be denoted 1, and the state in which terminal 78 is at substantially ground potential may be denoted 0. The same convention is used to denote the states of flip-flops 14, 16.

Fig. 2 is a chart describing the permutations of the states of flip-flops 12, 14 and certain selected states of flip-flop 16. If flip-flops 12, 14, 16 are placed in the states indicated in the four lines of Fig. 2, then upon the application of a shift pulse to terminal 90, flip-flops 12, 14, 16 will have the states indicated in the corresponding four lines of Fig. 3. The states of flip-flop 16 in Fig. 2 were chosen so that flip-flop 16 would change state each time a shift pulse was applied to register 10. It should also be noted that flip-flop 12 does not change state when a shift pulse is applied to register 10, since no means are illustrated to supply signals to its input terminals 84, 88.

If flip-flops 12, 14, 16 are placed in 0, 0, 1 states, respectively, by the application of negative pulses to set transistor 30 of flip-flop 12, set transistor 34 of flip-flop 14, and reset transistor 40 of flip-flop 16, then terminal 78 of flip-flop 12 and terminal 102 of flip-flop 14 will be substantially at ground potential and terminal 104 of flip-flop 16 will be at a negative potential. Gates 42, 46, 52 will be disabled since transistors 56, 64, 74 will be bottomed. Gates 44, 48, 50 will be enabled since transistors 58, 66, 72 will be cut off. When a shift pulse is applied to shift terminal 90, it is applied to the bases of transistors 54, 60, 62, 68, 70, 76 of gates 42, 44, 46, 48, 50, 52. This causes these transistors to bottom, and they remain bottomed for the period of time the shift pulse is present at, or applied to, shift terminal 90. In the enable gates the potentials of terminals connected to the collectors of the transistors, namely terminal 106 of gate 44, terminal 108 of gate 48, and terminal 110 of gate 50, increase in potential.

The change in potential of terminal 106 of gate 44 is coupled through capacitor 112 to input terminal 114 of flip-flop 14. Since input terminal 114 is substantially at ground potential, the pulse produced by enabled gate 44 upon the application of a shift pulse will produce no change in flip-flop 14, and flip-flop 14 will remain in the 0 state. The increase in potential of terminal 108 of gate 48 is coupled as a positive going pulse by capacitor 116 to input terminal 118 of flip-flop 16. This positive going pulse causes flip-flop 16 to change to its 0 state. If it is desired to place a succeeding flip-flop, which is not illustrated, in the state in which flip-flop 16 was prior to the application of a shift pulse, terminal 110 of gate 50 will be connected by capacitor 120 to the proper input terminal of the succeeding flip-flop to cause it to change to the 1 state.

The states of flip-flops 12, 14, 16 at the termination of the shift pulse appear in the first line of Fig. 3. When the shift pulse terminates, the gates are released to the control of the flip-flops to which they have a D.-C. connection. Gates 44, 48, 52 will become enabled, while gates 42, 46, 50 remain disabled. The negative output pulses produced as the gates become enabled at the termination of a shift pulse, however, do not cause any flip-flop to change state for the reasons pointed out above. If the states of flip-flops 12, 14, 16 are not changed by setting or resetting pulses and if a second shift pulse is applied to register 10, the information stored in register 10 will be shifted again. At the termination of the second pulse, flip-flop 16 will be in the same state that flip-flop 12 was placed in prior to the application of the first shift pulse. The maximum number of places information may be shifted to the right in the example illustrated is determined by the number of flip-flops in the register.

If flip-flop 12 is placed in the 0 state, flip-flop 14 in the 1 state, and flip-flop 16 in the 0 state by the application of the proper set and reset pulses to the proper set and reset transistors of the flip-flops, then the condition of the register is described by the second line of Fig. 2. When this is the case, gates 42, 48, 50 are disabled and gates 44, 46, 52 are enabled. When a shift pulse is applied to shift terminal 90, enabled gate 44 produces a positive going pulse which is applied to input terminal 114, causing flip-flop 14 to change to the 0 state. At the same time, the potential of terminal 121 which is connected to the collectors of transistors 62, 64 becomes positive suddenly and a positive pulse is coupled through capacitor 122 to input terminal 124 of flip-flop 16; this pulse causes flip-flop 16 to change to the 1 state. The potential of terminal 126 which is connected to the collectors of transistors 74, 76 becomes positive, and this change of potential may be coupled through capacitor 128 to the proper terminal of the succeeding flip-flop, which is not illustrated, to cause it to assume its 0 state. The states of flip-flops 12, 14 16 after the shift pulse terminates are described in line 2 of Fig. 3.

If flip-flops 12, 14, 16 are placed in the 1, 0, 1 states, respectively, as described in line 3 of Fig. 2, by the application of the negative going signal to the proper set and reset transistors of the flip-flop, then gates 44, 46, 52 will be disabled and gates 42, 48, 50 will be enabled. When a shift pulse is applied to shift terminal 90, enabled gate 42 produces a positive pulse which is applied to input terminal 98 of flip-flop 14, which causes flip-flop 14 to change to the 1 state. Enabled gate 48 produces a positive going pulse which is applied to input terminal 118 of flip-flop 16, which causes flip-flop 16 to change to the 0 state. Enable gate 50 also produces a pulse which could change a succeeding flip-flop, which is not illustrated, to the 1 state. The states of flip-flops 12, 14, 16 after the shift pulse terminates are described in line 3 of Fig. 3.

If flip-flops 12, 14 16 are placed in the stable states 1, 1, 0, respectively, as indicated in line 4 of Fig. 2, then gates 44, 48, 50 will be disabled and gates 42, 46, 52 will be enabled. If a shift pulse is applied to shift terminal 90, enabled gate 42 will produce a positive pulse which is applied to input terminal 98 of flip-flop 14. However, since terminal 98 is substantially at ground potential, this positive pulse will cause no change of state in flip-flop 14. Enabled gate 46 produces a positive pulse which causes flip-flops 16 to change to the 1 state, and enabled gate 52 produces a positive going pulse which can be used to place a succeeding flip-flop in the 0 state.

A perusal of Figs. 2 and 3 indicates that the information stored in flip-flops 12, 14, prior to the application of a shift pulse, is shifted to, or stored in, flip-flops 14, 16 at the termination of each shift pulse.

Fig. 4 is a block diagram of a shift register of *n* stages where $n$ may be any integer greater than 1. In Fig. 4 the reference numerals correspond with those which identify similar elements of the portion of the register illustrated in Fig. 1. From the foregoing it is believed to be clear that the number of stages which may be used in a given shift register is a matter of choice. If it is desired to provide for end-around carry of the information stored in the register, the $n$th bistable device may be provided with two conditional steering gates. The output signals of these gates would be applied to the proper input terminals of the first bistable device. End-around carry of the register illustrated in Fig. 1 can be achieved by connecting output terminal 110 of gate 50 to input terminal 88 by means of capacitor 120 and by connecting output terminal 126 of gate 52 by means of capacitor 128 to input terminal 84 of flip-flop 12.

In the register described and illustrated, the state of one flip-flop has been shifted or transferred to the next, or succeeding, flip-flop on its right. A register which shifts the stored information to the left can be easily made by connecting the output signals of the conditional steering gates to the proper input terminals of the preceding flip-flops. By doubling the number of conditional steering gates per flip-flop, it is, of course, possible to form a register which will shift stored information to the right or to the left. It is also possible to cause a flip-flop of one register to assume a state corresponding to a state of a flip-flop of another register by the use of conditional steering gates. The state of each flip-flop of a register may be determined by the potentials of the collectors of the transistors of such flip-flops, as is well known in the art.

In an embodiment of the invention, each of the transistors was a SB-100, each of the resistors had a value of substantially 680 ohms, and each of the capacitors had a value of 470 micromicrofarads. The collector supply potential was substantially 3 volts. The values and/or types of components and the voltages are enumerated, by way of example only, as being suitable for the devices illustrated. It is to be understood that circuit specifications in accordance with the invention may vary with the design for any particular application.

Obviously many modifications and variations of the present invention are possible in the light of the above teachings. It is, therefore, to be understood that within the scope of the appended claims the invention may be practiced other than as specifically described and illustrated.

What is claimed is:

1. In combination, a first and a second bistable device, each of said devices comprising a pair of cross-coupled junction transistors, a conditional steering gate comprising a first and a second junction transistor connected in parallel, means for applying shift pulses to the base of one of the transistors of said gate, circuit means for connecting the base of the other transistor of said gate to the collector of one of the transistors of the first bistable device, and a capacitor having two terminals, one terminal of the capacitor being connected to the collectors of the transistors of the gate and the other terminal of the capacitor being connected to the collector of one of the transistors of the second device.

2. In combination, a first and a second bistable device, each of said devices comprising a first and a second cross-coupled junction transistor, a first and a second conditional steering gate, each of said gates comprising a first and a second junction transistor connected in parallel, a shift terminal adapted to have shift pulses applied thereto, circuit means for connecting the base of one of the transistors of the first gate to the collector of the second transistor of the first device, circuit means for connecting the base of one of the transistors of the second gate to the collector of the first transistor of the first device, circuit means for connecting the shift terminal to the base of the other transistor of each of said gates, a first and a second capacitor, each of said capacitors having two terminals, one terminal of the first capacitor being connected to the collectors of the transistors of the first gate and the other terminal being connected to the collector of the second transistor of the second device, and one terminal of the second capacitor being connected to the collectors of the transistors of the second gate, and the other terminal being connected to the collector of the first transistor of the second device.

3. In combination; $n$ bistable flip-flops, where $n$ is an integer greater than 1, each of said bistable flip-flops comprising a first and a second cross-coupled transistor, the collector of the second transistor being the first input terminal of each flip-flop, the collector of the first transistor being the second input terminal of each flip-flop, $2(n-1)$ conditional steering gates, each of said steering gates comprising two transistors connected in parallel, the bases of said transistors serving as input terminals of each gate, a shift terminal, circuit means for connecting the base of one of the transistors of each gate to the shift terminal, two of said gates being controlled by each of $(n-1)$ flip-flops, the other input terminal of the first gate controlled by each flip-flop being connected to the first input terminal of its controlling flip-flop, the other input terminal of the second gate controlled by each flip-flop being connected to the second input terminal of its controlling flip-flop, a capacitor connecting the collectors of the transistors of the first gate controlled by each flip-flop to the first input terminal of an adjacent flip-flop, and a capacitor connecting the collectors of the transistors of the second gate with the second input terminal of said adjacent bistable flip-flop.

4. In a shift register; first and second flip-flop devices and a conditional steering-gate device, each of said devices comprising a pair of junction transistors, each of said transistors having a pair of input circuit electrodes and a pair of output circuit electrodes, one of said electrodes being common to the input and output circuits, each of said flip-flop devices including means connecting the input circuit electrodes of one transistor of the flip-flop across the output circuit electrodes of the other transistor of the flip-flop, said gate device including means connecting the output circuit electrodes of one transistor of the gate across the output circuit electrodes of the other transistor of the gate; means connecting the input circuit electrodes of one transistor of the gate across the output circuit electrodes of one of said transistors of said first flip-flop, whereby the condition of said gate is controlled by the state of said first flip-flop; means for connecting a source of shift pulses across the input circuit electrodes of the other transistor of the gate for changing the condition of said gate if it is in one condition but not if it is in the other; and a capacitor coupling the non-common output circuit electrodes of said gate pair of transistors to the non-common input circuit electrode of one of the transistors of said second flip-flop for passing a pulse signal to said second flip-flop when and only when the condition of said gate is changed by said shift pulse.

5. In a shift register as claimed in claim 4 characterized in that said input circuit electrodes are the emitter and base, and in that said output circuit electrodes are the collector and emitter, said electrode which is common to the input and output circuits being the emitter.

6. In a shift register as claimed in claim 5 further characterized in that connected in shunt with each flip-flop transistor is an additional transistor whose collector is connected to the collector of the said flip-flop transistor and whose emitter is connected to the emitter of the said flip-flop transistor, said additional transistor functioning as a set or reset device.

7. In a shift register; first and second flip-flop devices and first and second conditional steering-gate devices, each of said devices comprising a pair of junction transistors, each of said transistors having a pair of input circuit electrodes and a pair of output circuit electrodes, one of said electrodes being common to the input and output circuits, each of said flip-flop devices including means connecting the input circuit electrodes of one of the transistors of the flip-flop across the output circuit electrodes of the other transistor of the flip-flop, each of said gate devices including means connecting the output circuit electrodes of both transistors of the gate in parallel; means connecting the input circuit electrodes of one transistor of the first gate across the output circuit electrodes of one of the transistors of the first flip-flop, whereby the condition of the first gate is controlled by the state of said first flip-flop; means connecting the input circuit electrodes of one transistor of the second gate across the output circuit electrodes of the other transistor of the first flip-flop, whereby the condition of the second gate is oppositely controlled by the state of said first flip-flop; means for connecting a source of shift pulses across the input circuit electrodes of both of the other transistors of said first and second gates for changing the condition of one or the other but not both of said gates according to the state of said first flip-flop; means including a first series capacitor for coupling the non-common output circuit electrodes of the pair of transistors of the first gate to the non-common input circuit electrode of one of the transistors of the second flip-flop for passing a pulse signal to said one transistor of said second flip-flop when and only when the condition of said first gate is changed by said shift pulse; and means including a second series capacitor for coupling the non-common output circuit electrodes of the pair of transistors of the second gate to the non-common input circuit electrode of the other transistor of the second flip-flop for passing a pulse signal to said other transistor of said second flip-flop when and only when the condition of said second gate is changed by said shift pulse.

8. In a shift register as claimed in claim 7 characterized in that said input circuit electrodes are the emitter and base, and in that said output circuit electrodes are the collector and emitter, said electrode which is common to the input and output circuits being the emitter.

9. In a shift register; a plurality of flip-flops and a plurality of conditional steering gates, there being first and second gates associated with each flip-flop, each of said flip-flops and each of said gates comprising a pair of junction transistors, each of said transistors having a pair of input circuit electrodes and a pair of output circuit electrodes, one of said electrodes being common to the input and output circuits, each of said flip-flops including means connecting the input circuit electrodes of one of the transistors of the flip-flop across the output circuit electrodes of the other transistor of the flip-flop, each of said gates including means for connecting in parallel the output circuit electrodes of both transistors of the gate; means connecting the input circuit electrodes of one transistor of each first gate across the output circuit electrodes of one of the transistors of the associated flip-flop, whereby the condition of each first gate is controlled by the state of its associated flip-flop; means connecting the input circuit electrodes of one transistor of each second gate across the output circuit electrodes of the other transistor of the associated flip-flop, whereby the condition of each second gate is oppositely controlled by the state of said associated flip-flop; means for connecting a source of shift pulses across the input circuit electrodes of both of the other transistors of each first and second gates for changing the condition of one or the other but not both of said gates according to the state of the associated flip-flop; means including a first series capacitor for coupling the non-common output circuit electrodes of the pair of transistors of each first gate to the non-common input circuit electrode of one of the transistors of the flip-flop next adjacent to said associated flip-flop for passing a pulse signal to said next flip-flop when and only when the condition of said first gate is changed by said shift pulse; and means including a second series capacitor for coupling the output circuit electrodes of the transistors of each second gate to the non-common input circuit electrode of the other transistor of said next flip-flop for passing a pulse signal to said next flip-flop when and only when the condition of said second gate is changed by said shift pulse.

10. In a shift register as claimed in claim 9 characterized in that said input circuit electrodes are the base and emitter and in that said output circuit electrodes are the collector and emitter, said electrode which is common to the input and output circuits being the emitter.

11. In a shift register as claimed in claim 10 further characterized in that connected in shunt with each flip-flop transistor is an additional transistor whose collector is connected to the collector of the said flip-flop transistor and whose emitter is connected to the emitter of the said flip-flop transistor, said additional transistor functioning as a set or reset device.

12. In a shift register; a plurality of flip-flops and a plurality of conditional steering gates, there being a first and second conditional steering gate associated with each flip-flop, each of said flip-flops and steering gates comprising a pair of semi-conductor switches, each of said switches having a pair of input circuit terminals and a pair of output circuit terminals, each of said flip-flops including means connecting the input circuit terminals of one of the switches of the flip-flop across the output circuit terminals of the other switch of the flip-flop, each of said gates including means for connecting the output circuit terminals of both switches of the gate in parallel; means connecting the input circuit terminals of one switch of each first gate across the output circuit terminals of one of the switches of the associated flip-flop, whereby the condition of each first gate is controlled by the state of said associated flip-flop; means connecting the input circuit terminals of one switch of each second gate across the output circuit terminals of the other switch of the associated flip-flop, whereby the condition of each second gate is oppositely controlled by the state of said associated flip-flop; means for connecting a source of shift pulses across the input circuit terminals of both of the other switches of each said first and second gates for changing the condition of one or the other but not both of said gates according to the state of the associated flip-flop; means including a first series capacitor for coupling the output circuit terminals of the pair of switches of each first gate across the input circuit terminals of one of the switches of each flip-flop next adjacent said assocітated flip-flop for passing a pulse signal to said next flip-flop when and only when the condition of said first gate is changed by said shift pulse; and means including a second series capacitor for coupling the output circuit terminals of the switches of each second gate across the input circuit terminals of the other switch of said next flip-flop for passing a pulse to said next flip-flop when and only when the condition of said second gate is changed by said shift pulse.

13. In a shift register as claimed in claim 8 further characterized in that connected in shunt with each flip-flop transistor is an additional transistor whose collector is connected to the collector of the said flip-flop transistor and whose emitter is connected to the emitter of the said flip-flop transistor, said additional transistor functioning as a set or reset device.

14. In combination; a plurality of flip-flops and a plurality of conditional steering gates, there being first and second gates associated with each flip-flop, each of said flip-flops and each of said gates comprising a pair of junction transistors, each of said transistors having a pair of input circuit electrodes and a pair of output circuit electrodes, one of said electrodes being common to the input and output circuits, each of said flip-flops including means connecting the input circuit electrodes of one of the transistors of the flip-flop across the output circuit electrodes of the other transistor of the flip-flop, each of said gates including means for connecting in parallel the output circuit electrodes of both transistors of the gate; means connecting the input circuit electrodes of one transistor of each first gate across the output circuit electrodes of one of the transistors of the associated flip-flop, whereby the condition of each first gate is controlled by the state of its associated flip-flop; means connecting the input circuit electrodes of one transistor of each second gate across the output circuit electrodes of the other transistor of the associated flip-flop, whereby the condition of each second gate is oppositely controlled by the state of said associated flip-flop; means for connecting a source of shift pulses across the input circuit electrodes of both of the other transistors of each first and second gates for changing the condition of one or the other but not both of said gates according to the state of the associated flip-flop; means including a first series capacitor for coupling the non-common output circuit electrodes of the pair of transistors of each first gate to the non-common input circuit electrode of one of the transistors of a flip-flop other than said associated flip-flop for passing a pulse signal to said other flip-flop when and only when the condition of said first gate is changed by said shift pulse; and means including a second series capacitor for coupling the input circuit electrodes of the transistors of each second gate to the non-common input circuit electrode of the other transistor of said other flip-flop for passing a pulse signal to said other flip-flop when and only when the condition of said second gate is changed by said shift pulse.

15. Apparatus as claimed in claim 14 characterized in that said input circuit electrodes are the base and emitter and in that said output circuit electrodes are the collector and emitter, said electrode which is common to the input and output circuits being the emitter.

16. Apparatus as claimed in claim 15 further characterized in that connected in shunt with each flip-flop transistor is an additional transistor whose collector is connected to the collector of the said flip-flop transistor and whose emitter is connected to the emitter of the said flip-flop transistor, said additional transistor functioning as a set or reset device.

References Cited in the file of this patent

UNITED STATES PATENTS

| | | |
|---|---|---|
| 2,404,047 | Flory et al. | July 16, 1946 |
| 2,409,689 | Morton et al. | Oct. 22, 1946 |
| 2,445,215 | Flory | July 13, 1948 |
| 2,580,771 | Harper | Jan. 1, 1952 |
| 2,715,678 | Barney | Aug. 16, 1955 |
| 2,764,343 | Diener | Sept. 25, 1956 |
| 2,785,304 | Bruce et al. | Mar. 12, 1957 |
| 2,808,203 | Geyer et al. | Oct. 1, 1957 |

OTHER REFERENCES

Electronics, June 1955, pages 132–136, "Directly Coupled Transistor Circuits," by R. H. Beter et al. (Fig. 7 at page 135 relied on.)